US012580650B2

(12) United States Patent (10) Patent No.: US 12,580,650 B2
Barnwell et al. (45) Date of Patent: Mar. 17, 2026

(54) INDIRECT OPTICAL COMMUNICATION

(71) Applicant: Naval Information Warfare Center Pacific, San Diego, CA (US)

(72) Inventors: Nathan Scott Barnwell, San Diego, CA (US); Brittany E. Lynn, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 308 days.

(21) Appl. No.: 18/295,332

(22) Filed: Apr. 4, 2023

(65) Prior Publication Data

US 2024/0340082 A1 Oct. 10, 2024

(51) Int. Cl.
*H04B 10/11* (2013.01)
*H04B 10/50* (2013.01)

(52) U.S. Cl.
CPC ........... *H04B 10/11* (2013.01); *H04B 10/503* (2013.01)

(58) Field of Classification Search
CPC .............................. H04B 10/503; H04B 10/11
USPC .................................................. 398/111, 118
See application file for complete search history.

(56) References Cited

U.S. PATENT DOCUMENTS

| | | | | |
|---|---|---|---|---|
| 2016/0254865 | A1* | 9/2016 | Hening .............. | H04B 10/1123 398/104 |
| 2018/0263103 | A1* | 9/2018 | Exton ................... | B64C 23/005 |
| 2019/0379459 | A1* | 12/2019 | Kim ...................... | H04B 10/564 |
| 2022/0390553 | A1* | 12/2022 | Englesbe ............ | G01S 13/0209 |
| 2024/0204880 | A1* | 6/2024 | Howe .................... | H04B 10/11 |
| 2024/0244738 | A1* | 7/2024 | Walczak ............... | H01S 3/2383 |

OTHER PUBLICATIONS

Kumar et al; Detection and analysis of low-frequency electromagnetic emissions from ns laser induced breakdown of air; May 2012; The International Society for Optical Engineering; pp. 1-7. (Year: 2012).*

* cited by examiner

*Primary Examiner* — Amritbir K Sandhu
(74) *Attorney, Agent, or Firm* — Naval Information Warfare Center Pacific; Kyle Eppele

(57) ABSTRACT

A communication method including emitting laser pulses as a signal using one or more transmitters at an atmospheric point. Plasma is generated at the atmospheric point to radiate omnidirectional light. The plasma from the atmospheric point is detected using one or more receivers. The one or more receivers have a direct line-of-sight to the atmospheric point to receive the signal from the one or more transmitters via the omnidirectional light generated by the plasma. The signal is demodulated from the transmitted plasma at each receiver, thereby transmitting information encoded on the signal.

4 Claims, 4 Drawing Sheets

INDIRECT OPTICAL COMMUNICATION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; NIWC_Pacific_T2@us.navy.mil. Reference Navy Case Number 113247.

BACKGROUND

Optical communication involves using light to transmit information over a distance. The earliest forms of optical communication included visual optical communication, but current optical communication includes electronics. Modern optical communication requires direct line-of-sight between a transmitter and a receiver. This is because optical frequencies have $10^5$ times higher frequency compared to radio waves. As a result, the electromagnetic waves produced during optical communication have difficulty transmitting through common obstacles, such as wood, concrete, or glass. Due to the difficulty transmitting through obstacles, free-space, optical communication has often been limited to applications with direct line-of-sight.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Free-space communication has traditionally used radio waves by radiating a signal from a transmitter to a receiver. The transmitted radiated signal may travel in a straight path (line-of-sight), reflect off objects, propagate through objects, or some combination thereof before reaching the receiver. Radio waves can be reflected off and transmitted through common building materials like wood, concrete, and glass. As a result, radio waves, which have a frequency of about 3 MHz to 30 MHz can be refracted, reflected, and guided by the atmosphere to enable worldwide communication. Other communication methods that use higher frequency signals, such as optical communication, are challenging to use for non-line-of-sight communication. This is because higher frequency signals have difficulty transmitting through most common building materials, except for glass and transparent plastics. As a result, higher frequency communication methods are limited to shorter range, line-of-sight communication.

The optical communication method herein uses a high frequency signal ($10^5$ times higher than radio frequencies) to transmit a non-line-of-sight worldwide optical signal. This is possible due to the method utilizing a transmitter capable of producing laser-induced plasma. The transmitter has a laser that is pulsed into the atmosphere at an atmospheric point within its field-of-view. The laser induces a plasma optical signal at the atmospheric point. The receiver, which can be located anywhere within a line-of-sight or a reflected line-of-sight of the atmospheric point, locates, receives, and demodulates the optical signal. The ability to transmit the optical signal worldwide is possible since multiple receivers can receiver a single signal or a receiver can function as both a receiver and transmitter (i.e., transceiver) to create a relay communication system. As a result, non-line-of-sight worldwide optical communication is possible.

The communication method herein includes emitting laser pulses as a signal using one or more transmitters at an atmospheric point. Plasma is generated at the atmospheric point to radiate omnidirectional light. The plasma from the atmospheric point is detected using one or more receivers. The one or more receivers have a direct line-of-sight to the atmospheric point to receive the signal from the one or more transmitters via the omnidirectional light generated by the plasma. The signal is demodulated from the transmitted plasma at each receiver, thereby transmitting information encoded on the signal.

Figure 1:
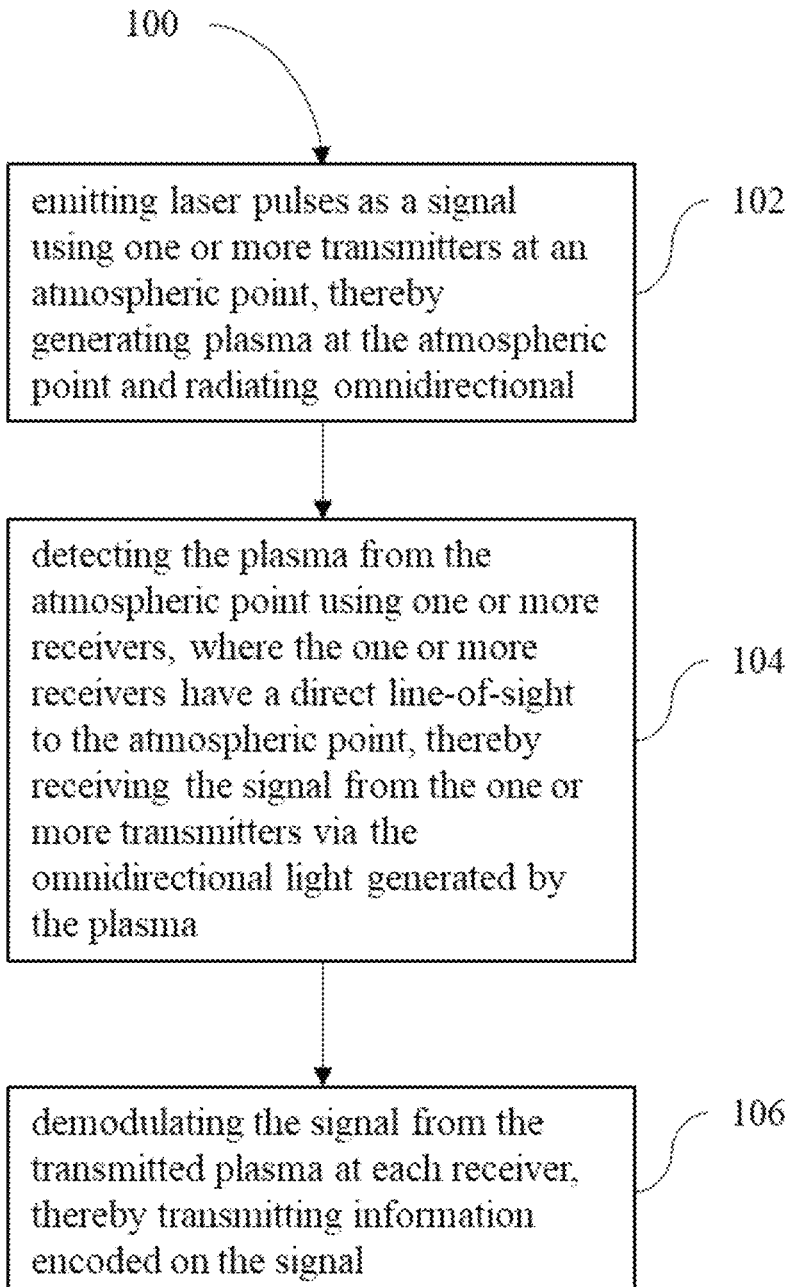
FIG. 1 is an example of the method of communication described herein.
Figure 2:
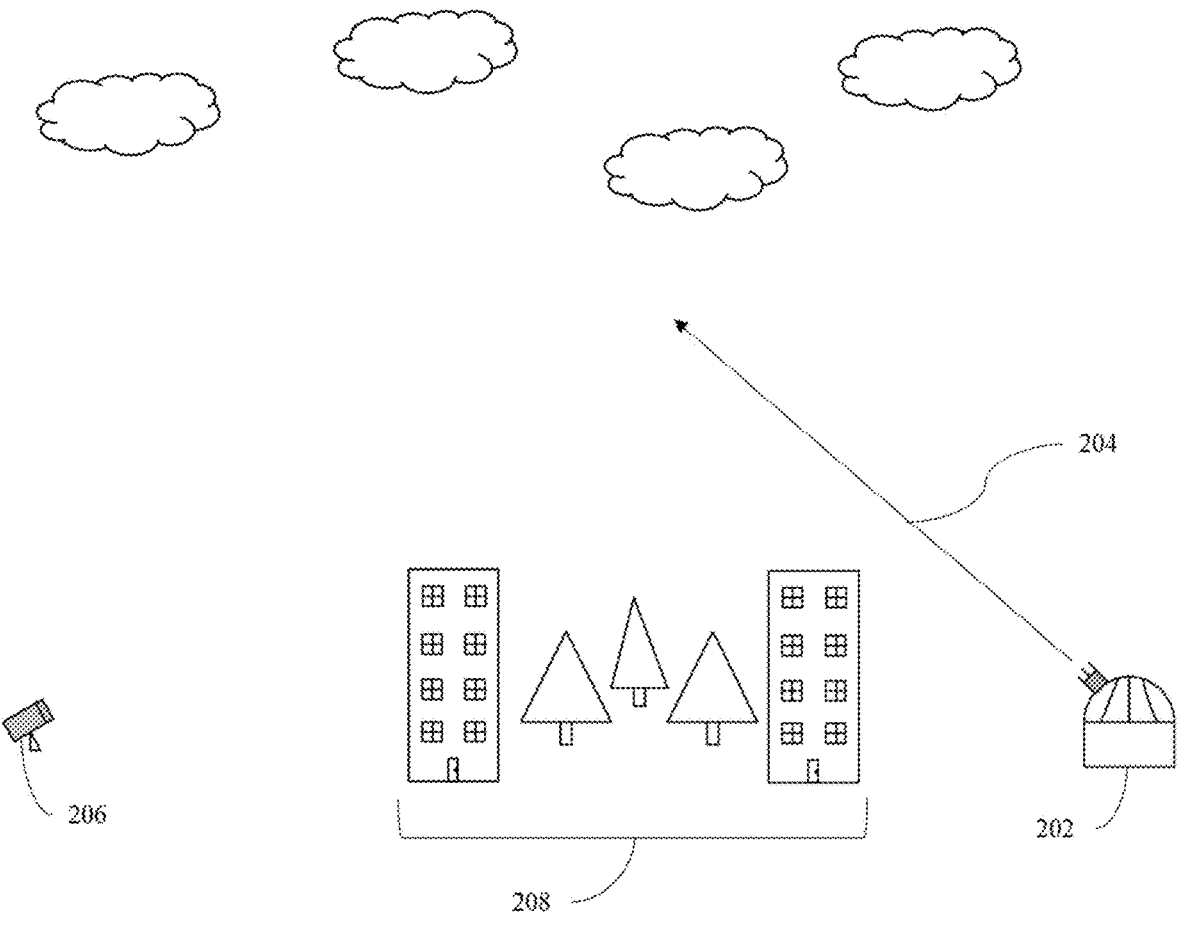
FIG. 2 shows an example of a transmitter emitting a laser pulse at an atmospheric point.
Figure 3:
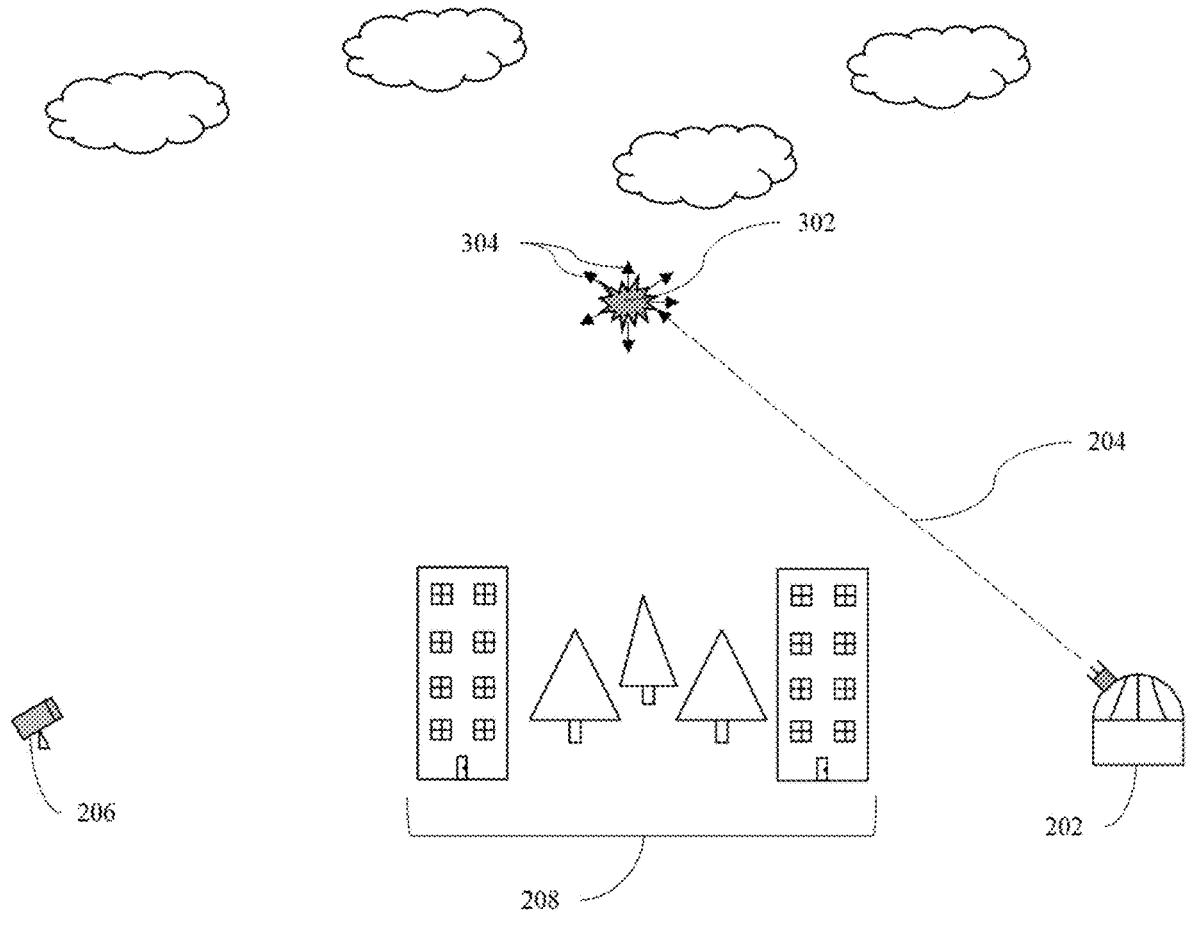
FIG. 3 shows an example of the laser pulse inducing a plasma at the atmospheric point, thereby radiating omnidirectional light.

Referring now to FIG. 1, the communication method 100 includes emitting laser pulses 102 as a signal using one or more transmitters at an atmospheric point, thereby generating plasma at the atmospheric point and radiating omnidirectional light. An example of 102 is shown in FIG. 2 and FIG. 3. In FIG. 2 and FIG. 3, any hatching patterning is for illustrative purposes only to aid in viewing and should not be construed as being limiting or directed to a particular material or materials. In FIG. 2, the transmitter 202 emits laser pulses 204 at an atmospheric point 302. In the example shown in FIG. 2, the receiver 206 has a direct line-of-sight to the atmospheric point 302 and an indirect line-of-sight to the transmitter 202 since obstacles 208 block the path between the transmitter 202 and receiver 206. In FIG. 3, the one or more transmitters 202 create the plasma at the atmospheric point 302, which radiates omnidirectional light 304 with a direct line-of-sight to the receiver 206. In other examples, the receiver 206 may have an indirect line-of-sight to the transmitter 202, the atmospheric point 302, and the omnidirectional light 304 by having a reflective line-of-sight to the atmospheric point 302 and omnidirectional light 304 (e.g., a mirror). In yet another example, the receiver 206 may have a direct line-of-sight to the transmitter 202, the atmospheric point 302, and omnidirectional light 304.

The one or more transmitters 202 may be any laser capable of emitting laser pulses 204 to create plasma at the atmospheric point 302. The power of the laser may vary depending on the distance of the atmospheric point 302, local atmospheric conditions, and the desired plasma size and brightness requirements. Other factors that contribute to the amount of power required for the laser include the wavelength of the laser, the pulse duration, and any chemical species in the air. In some examples, there are two or more transmitters 202 emitting laser pulses 204 with sufficient energy to create plasma at the same atmospheric point. In other examples, there are two or more transmitters 202 emitting laser pulses at different atmospheric points. In an example, the one or more transmitters 202 may be a laser with a temporal pulse width ranging from about 1 femtosecond to about 100 nanoseconds. In another example, an ultra-short pulse (e.g., femto to picoseconds) is used to start the plasma generation followed by a longer pulse (e.g., nanoseconds) to enhance the plasma effect. Any pulsed modulation technique may be used with the laser to modulate the signal. Some examples include on-off keying, pulse-position modulation, pulse amplitude modulation, or a combination thereof. In some examples, when a combination of pulsed modulation techniques are used, each pulsed modulation technique may encode a signal for the same data or encode a signal for different data. The one or more transmitters 202 may be either stationary or attached to a mobile platform (e.g., a vehicle, airplane, train, etc.). In some examples, the one or more transmitters 202 are emitting laser pulses while on a moving mobile platform. In an example, the signal created by the transmitters 202 from the plasma is an electromagnetic signal, an acoustic signal, or a combination thereof. In another example, the signal is an optical signal accompanied by a second electromagnetic signal, an acoustic signal, or a combination thereof.

Figure 4:
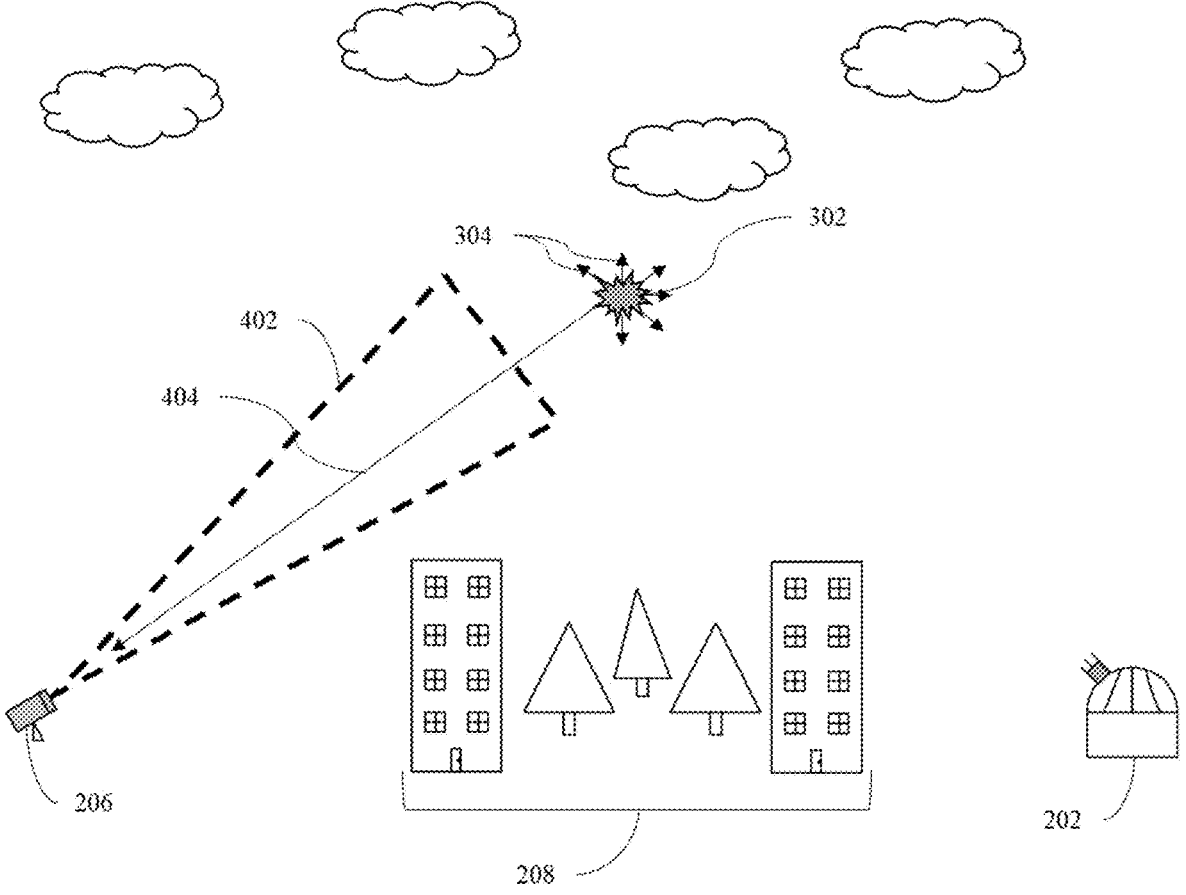
FIG. 4 shows an example of a receiver detecting a portion of the light emitted from the plasma.

Referring back to FIG. 1, the communication method 100 includes detecting the plasma 104 from the atmospheric point 302 using one or more receivers 206. In one example, the one or more receivers 206 have a direct line-of-sight to the atmospheric point 302, thereby receiving the signal from the one or more transmitters 202 via the omnidirectional light 304 generated by the plasma. As stated previously, other examples may include the one or more receivers 206 having an indirect line-of-sight to the atmospheric point 302 via a reflective surface (i.e., a reflective direct line-of-sight). An example of 104 is shown in FIG. 4. In FIG. 4, any hatching patterning is for illustrative purposes only to aid in viewing and should not be construed as being limiting or directed to a particular material or materials. FIG. 4 shows an example of the one or more receivers 206 having a direct line-of-sight 402 to the atmospheric point 302 radiating omnidirectional light 304. The one or more receivers 206 detect the omnidirectional light 404 within the line-of-sight 402.

The one or more receivers 206 may be any type of receiver that have a bandwidth to detect omnidirectional light 304 at a frequency ranging from about 300 GHz to about 3000 THz. In some examples, the one or more receivers 204 are a transceiver that can detect, demodulate, and reemit the signal to a second atmospheric point to generate plasma at the second atmospheric point and radiate omnidirectional light 304, thereby forming a relay optical communication system. In some examples, the one or more receivers 206 may be stationary or attached to a mobile platform (e.g., a vehicle, airplane, train, etc.). In some examples, the one or more receivers 206 are detecting plasma while moving on a mobile platform. The one or more receivers 206 scan for the plasma using a scanning system, a wide field of view system, a narrow field of view system, or a combination thereof. Some examples of the one or more receivers 206 include a photodetector, photomultiplier tube (PMT), a PIN diode photodetector, a camera, or a combination thereof. The photodetector may be a silicon-based detector or an InGaAs detector.

Referring back to FIG. 1, the communication method 100 further includes demodulating the signal from the plasma at each receiver 206, thereby transmitting information encoded on the signal. The one or more receivers 206 include hardware to demodulate the signal from the omnidirectional light 304 produced by the plasma. Some examples of the demodulation include optical-to-analog electrical demodulation, analog-to-digital demodulation, digital-to-bits demodulation, bits-to-symbols demodulation, on-off-keying demodulation, or a combination thereof.

A system for optical communication is also disclosed herein. The system includes one or more transmitters and one or more receivers. The one or more transmitters and one or more receivers are the same one or more transmitters and one or more receivers as previously disclosed herein. The one or more transmitters emit laser pulses as a signal at an atmospheric point, thereby generating plasma at the atmospheric point and radiating omnidirectional light. The one or more receivers have a direct line-of-sight to the plasma to detect the plasma from the atmospheric point, thereby receiving the signal from the one or more transmitters via the plasma. Additionally, each receiver demodulates the signal from the transmitted plasma, thereby transmitting information encoded on the signal.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 1 femtosecond to about 100 nanoseconds should be interpreted to include not only the explicitly recited limits of from about 1 femtosecond to about 100 nanoseconds, but also to include individual values, such as 25 nanoseconds, 50 nanoseconds, 75 nanoseconds, etc., and sub-ranges, such as from about 25 nanoseconds to about 75 nanoseconds, etc.

In describing and claiming the examples disclosed herein, the singular forms "a", "an", and "the" include plural referents unless the context clearly dictates otherwise.

What is claimed is:

1. A communication method, comprising:
    emitting laser pulses as a signal using one or more transmitters at an atmospheric point, thereby generating plasma at the atmospheric point and radiating omnidirectional light;
    detecting the plasma from the atmospheric point using one or more receivers, wherein the one or more receivers have a direct line-of-sight or reflective line of sight to the atmospheric point, thereby receiving the signal from the one or more transmitters via the omnidirectional light generated by the plasma;

demodulating the signal from the plasma at each receiver, thereby transmitting information encoded on the signal; and wherein the one or more receivers are configured as transceivers that reemit laser pulses at a second atmospheric point, thereby generating plasma at the second atmospheric point and radiating the omnidirectional light.

2. A communication method, comprising:

emitting laser pulses as a signal using one or more transmitters at an atmospheric point, thereby generating plasma at the atmospheric point and radiating omnidirectional light;

detecting the plasma from the atmospheric point using one or more receivers, wherein the one or more receivers have a direct line-of-sight or reflective line of sight to the atmospheric point, thereby receiving the signal from the one or more transmitters via the omnidirectional light generated by the plasma;

demodulating the signal from the plasma at each receiver, thereby transmitting information encoded on the signal; and wherein the one or more receivers have a reflective direct line-of-sight optical path to the atmospheric point.

3. A system comprising:

one or more transmitters, wherein the one or more transmitters emit laser pulses as a signal at an atmospheric point, thereby generating plasma at the atmospheric point and radiating omnidirectional light;

one or more receivers, wherein the one or more receivers have a direct line-of-sight to the plasma to detect the plasma from the atmospheric point, thereby receiving the signal from the one or more transmitters via the plasma;

wherein each receiver demodulates the signal from the transmitted plasma, thereby transmitting information encoded on the signal;

wherein the one or more receivers include a photodetector, photomultiplier tube (PMT), a PIN diode photodetector, a camera, or a combination thereof, configured to detect plasma-induced omnidirectional light emissions; and wherein the one or more receivers are a transceiver that can remitting laser pulses as the signal at a second atmospheric point, thereby generating plasma at the second atmospheric point and radiating the omnidirectional light.

4. A system comprising:

one or more transmitters, wherein the one or more transmitters emit laser pulses as a signal at an atmospheric point, thereby generating plasma at the atmospheric point and radiating omnidirectional light;

one or more receivers, wherein the one or more receivers have a direct line-of-sight to the plasma to detect the plasma from the atmospheric point, thereby receiving the signal from the one or more transmitters via the plasma;

wherein each receiver demodulates the signal from the transmitted plasma, thereby transmitting information encoded on the signal; and wherein the one or more receivers have a reflective direct line-of-sight to the atmospheric point.

* * * * *